March 3, 1959 J. R. ANDERSON 2,876,435

ELECTRICAL CIRCUITS EMPLOYING FERROELECTRIC CONDENSERS

Filed June 7, 1955 3 Sheets-Sheet 1

INVENTOR
J. R. ANDERSON
BY
*[signature]*
ATTORNEY

INVENTOR
J. R. ANDERSON
BY
ATTORNEY

INVENTOR
J. R. ANDERSON
BY [signature]
ATTORNEY 2,876,435

ELECTRICAL CIRCUITS EMPLOYING FERROELECTRIC CONDENSERS

John R. Anderson, Berkeley Heights, N. J., assignor to Bell Telephone Laboratories, Incorporated, New York, N. Y., a corporation of New York Application June 7, 1955, Serial No. 513,710

16 Claims. (Cl. 340—173)

This invention relates to electrical circuits and, more particularly, to such circuits employing ferroelectric condensers.

Binary information may be stored in storage or memory condensers having dielectrics of a ferroelectric material by applying pulses to the condensers to leave the ferroelectric material in one or the other of its two states of remanent polarization on removal of the pulses; this is fully disclosed, inter alia, in my Patent 2,717,372, issued September 6, 1955. The dielectric may be of barium titanate, or guanidinium aluminum sulphate hexahydrate, as disclosed in application Serial No. 489,193, filed February 18, 1955, of B. T. Matthias, or of other materials exhibiting ferroelectric properties.

Binary information may also be stored by employing two serially connected ferroelectric condensers, the sensing or reading pulses being applied across the serially connected condensers to derive output pulses indicative of the stored information; this is disclosed in my Patent 2,695,396, issued November 23, 1954. As more fully described in that patent, the state of polarization of the two serially connected condensers may be individually determined but the output from the condensers is dependent on the relation between the remanent polarizations of the two condensers. If both condensers are polarized in the same direction and this direction opposes the polarity of the applied pulse, then the state of polarization of both condensers will be reversed, and a large output signal derived in the output circuit. However, if the polarizations of the two condensers are in opposition to each other, then the polarizations of these condensers are not reversed by a pulse of either polarity applied across the series circuit, and a small or negligible output signal is derived in the output circuit.

Devices capable of storing binary information may be utilized in shift register circuits wherein the information is shifted down an array of such devices in response to the application of shift or power signals. Prior shift register circuits employing ferroelectric condensers have, however, been limited in their applicability.

It is a general object of this invention to provide an improved ferroelectric storage circuit.

Another object of this invention is to provide an improved shift register circuit employing ferroelectric condensers. More specifically, objects of this invention include providing shift register circuits capable of utilizing either parallel or series inputs and with either parallel or series outputs.

A further object of this invention is to provide a shift register circuit using a single pulse source applying pulses simultaneously to all the stages of the shift register to effect transfer of the pulses from each stage to the next.

A further object of this invention is to provide a ferroelectric circuit responsive to a predetermined code by selectively connecting the output circuits of a shift register circuit in parallel.

A still further object of this invention is to provide a ferroelectric storage circuit for code conversion by utilizing a shift register having parallel output circuits selectively connected together.

Briefly, in one specific embodiment of this invention, a ferroelectric condenser, a pair of diodes and a resistance are connected in series to constitute a storage circuit, the output being taken across the resistor. One of the diodes exhibits the normal diode characteristics and the other exhibits a saturation characteristic. By saturation characteristic is meant that upon the application of a voltage opposite to that which would ordinarily render the diode conducting, no current will pass through the diode until this applied voltage passes a saturation or transition point. Beyond this point, the diode becomes conductive and the current increases sharply due to the application of any additional voltage. The explanation for this unusual increase in current appears to involve the sudden release of electrons or holes within the diode element which gives rise to an increase in the already prevalent reverse current. This process is cumulative and leads to large increases in currents for small further increases in voltage. These diodes, which are sometimes referred to as Zener diodes, avalanche diodes, or threshold diodes as well as saturation diodes, are described in an article "Transistors and Junction Diodes" by F. H. Chase, B. H. Hamilton, and D. H. Smith in the Bell System Technical Journal, volume 33, page 827 (July 1954), and in Patent 2,714,702, issued August 2, 1955, of W. Shockley.

Across the ferroelectric condenser, a pulse is applied of such polarity as to store information in the condenser by reversing its direction of polarization. Subsequent to application of this storage pulse, a sensing or read-out pulse is applied across the series circuit including the diodes to derive an output pulse indicative of the previously stored information. An output signal does not appear at the resistor on application of the store pulse due to the interposition of a diode between the condenser and the resistor poled so as to oppose passage of an output from the condenser due to the store pulses. Similarly, the sensing or read-out pulse is not conducted to the storage input source due to the presence of a diode poled to oppose its passage between the storage condenser and that portion of the input circuit. It is therefore apparent that both the magnitude and polarity of the applied pulses determine the storage and read-out operation of the storage circuit.

In specific embodiments of this invention, ferroelectric storage circuits including serially connected pairs of diodes, at least one of which diodes exhibits a reverse voltage saturation characteristic, are incorporated into stages of shift register circuits, each stage including a first and a second ferroelectric condenser and the pair of diodes interposed between the pair of condensers. The stages of the shift register are interconnected by a diode connected between the second condenser of the preceding stage and the first condenser of the succeeding stage. In shift register circuits in accordance with one aspect of this invention, the pair of diodes interposed in each stage of the shift register, one of the diodes being a saturation diode, and the coupling diode between stages define an amplitude and polarity responsive shifting circuit so that for one polarity pulse appearing on the common shift bus the two condensers of one stage are connected in series and for the opposite polarity pulse the upper condenser of the succeeding stage and the lower condenser of the preceding stage are connected in series. In this manner information may be shifted along the stages of the register, an information pulse in effect being shifted from the upper condenser of one stage, to the lower condenser of that stage, to the upper condenser of the next stage, to the lower condenser of that next stage, etc.

The gating property of the diodes and specifically of the saturation diode in series with the ferroelectric condenser performs two functions in specific embodiments of this invention. The first of these is to isolate the input circuit, which may comprise the coupling diode from a prior stage, the output circuit, which may comprise the coupling diode to the succeeding stage, and the power or shift pulse connection or common bus. The second of these functions of the saturation diode is to prevent the switching current through one condenser from flowing through more than one output path or stage at a time. Thus the saturation diodes prevent partial switching of pairs of condensers also connected to the common shift register pulse bus but which are not to be affected by the shift pulse applied thereto.

Advantageously in specific embodiments of this invention, the reverse saturation voltage of the saturation diodes should be at least as great as the voltage required to switch the state of the ferroelectric condensers in order to provide proper margin to prevent the shift voltage applied across the pairs of condensers shifting improper pairs. However, I have found it sufficient if the reverse saturation voltage be approximately the same as the voltage required to switch the ferroelectric condensers. Accordingly in a shift register circuit in accordance with this invention in which it is desired to switch a pair of serially connected ferroelectric condensers having a pair of diodes interposed therebetween, one of the diodes being a saturation diodes, the shift pulse applied across the pair of condensers and saturation diode should be of the order of three times the voltage required for the switching of one ferroelectric condenser alone. In other embodiments wherein only a single ferroelectric condenser is connected in series with a saturation diode, the sensing and storage voltages need only be of the order of twice the voltage for switching the state of polarization of the ferroelectric condenser.

It is a feature of this invention that a ferroelectric storage circuit comprise a pair of ferroelectric condensers and a pair of diodes connected in series therewith, the diodes being poled in opposition to each other and at least one of the diodes being a saturation diode having a reverse voltage saturation characteristic.

It is another feature of this invention that a saturation diode is employed in combination with a nonsaturable diode to control the switching in a ferroelectric circuit.

It is another feature of this invention that a saturation diode and an ordinary diode be connected in series between two ferroelectric condensers to control the transfer of information between the condensers.

It is another feature of this invention that a saturation diode and an ordinary diode be connected in series between two ferroelectric condensers to constitute one of a number of stages of a shift register and an ordinary diode be employed to couple the stages to permit switching control from a single bus applying shift pulses to the shift register circuit.

A further feature of this invention pertains to a ferroelectric shift register having the input terminal and selected output resistors connected in parallel to an And gate for recognition of a predetermined code signal.

A further feature of this invention relates to a ferroelectric shift register for code conversion having two series inputs, a common shift bus and output resistors connected in predetermined parallel combinations to give a code output in response to a code input.

A further feature of this invention involves utilization of parallel inputs to each stage of a ferroelectric shift register. These inputs include a pair of diodes connected in series opposition, one of which exhibits a saturation characteristic.

A complete understanding of this invention and of these and various other features thereof may be gained from consideration of the following detailed description and the accompanying drawings in which.

Figure 1:
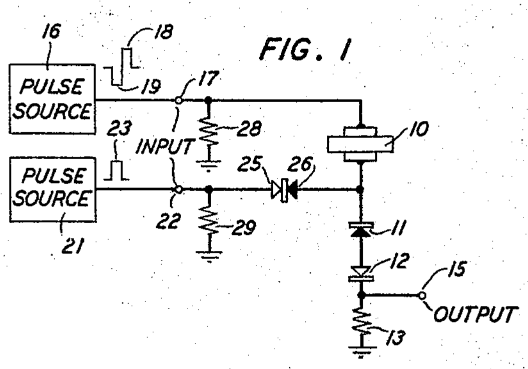
Fig. 1 is a schematic representation of one specific embodiment of the invention using pairs of diodes in combination with a ferroelectric storage condenser to control the switching required for the storing and sensing of information by the ferroelectric condenser.

Referring to Fig. 1 of the drawing, a ferroelectric storage condenser 10 is connected in series with a pair of diodes 11 and 12 and a resistor 13. As is known in the art, condenser 10 has a dielectric of a ferroelectric material, such as barium titanate, and a pair of electrodes thereon. An output terminal 15 is connected between diode 12 and resistance 13. A first pulse source 16 is connected to terminal 17 to apply sensing pulses 18 and partial storage pulses 19 to the series circuit. A second pulse source 21 is connected to terminal 22 to apply a second partial storage pulse 23 which cooperates with the storage pulses 19 in switching the ferroelectric condener 10, as discussed further in my Patent 2,717,373, issued September 6, 1955. Diodes 25 and 26 are connected between the storage pulse terminal 22 and the lower terminal of ferroelectric condenser 10.

Figure 2:
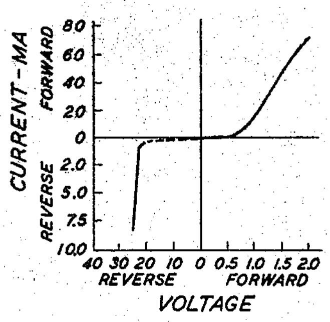
Fig. 2 is a graph illustrating the voltage-current characteristics of one specific saturation or avalanche diode that may be employed in combinations in accordance with this invention.

Diodes 11 and 26 are of the type known variously as saturation or avalanche diodes and exhibit a negative saturation characteristic of the type indicated generally in Fig. 2. From this graph, it is seen that a reverse voltage produces very little current through the diode until that voltage reaches the saturation voltage of the diode which, for the diodes employed in this embodiment, was approximately 22 volts. Beyond this saturation point, a slight increment in reverse voltage produces a large increment in reverse current and the diode merely acts as a low impedance path.

Resistors 28 and 29 are connected between terminal 17 and ground and terminal 22 and ground, respectively. It is understood, however, that these resistors might be combined with the respective pulse sources 16 and 21 connected to these terminals. Similarly while the pairs of oppositely poled diodes, such as diodes 11, 12 and 25, 26, of which at least one of the pair is a saturation diode, are depicted and referred to herein as separate and distinct elements, it is to be understood that in specific embodiments of this invention they may be combined as a single unit, as in a double anode fused junction silicon diode. Thus I have found that both diodes 11 and 12 or diodes 25 and 26 may be saturation diodes in embodiments of this invention.

An understanding of the cooperation between the saturation diodes and the ferroelectric condenser in accordance with this invention can be gained from consideration of the operation of the specific embodiment of this invention depicted in Fig. 1 and just described above. We shall assume that in its initial state of polarization a "0" is stored and the state of polarization is such as to be reversed by the application of the partial store pulses 19 and 23 of the polarity indicated in Fig. 1. The saturation diodes 11 and 26 each have a reverse saturation voltage $S_1$ which is chosen as that value sufficient to reverse the polarization of the ferroelectric condenser 10. When the positive store pulse 23 of a voltage $+S_1$ is applied to the input terminal 22 from source 21 at the same time that a negative store pulse 19 of value $-S_1$ is applied to the power pulse terminal 17 from source 16, the combined voltage applied across saturation diode 26 and ferroelectric condenser 10 is $2S_1$, in a direction opposed to the initial polarization of condenser 10, and of value sufficient to break down saturation diode 26 and thereby cause reversal of the state of polarization of the ferroelectric condenser 10 and storage of "1" therein. Subsequently, a sensing pulse 18 of value $+2S_1$ is applied to the power pulse terminal 17. This pulse 18 is opposed to the polarization of the ferroelectric condenser wherein "1" is stored and also to the polarity of the saturation diode 11. Since this value is sufficient to reverse the condenser and saturate the diode, a reversal of the domains takes place and an output pulse is transmitted through diodes 11 and 12 to the output terminal 15. This output pulse will not be fed back through saturation diode 26 due to the diode 25 which is poled to oppose the flow of current in that direction. Similarly, when the state of polarization of the ferroelectric condenser 10 is reversed by the store pulses 19 and 23, no output pulse appears at terminal 15 due to the presence of diode 12.

Figure 3:
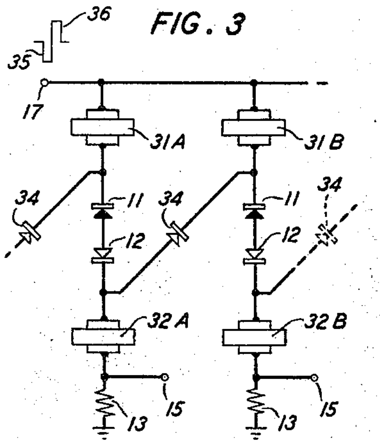
Fig. 3 is a schematic diagram of two stages of a shift register circuit in accordance with another specific embodiment of this invention.

The basic circuit in accordance with this invention, one embodiment of which is depicted in Fig. 1, may be advantageously employed in novel shift register circuits employing the principles described above with reference to Fig. 1 and employing a second ferroelectric condenser positioned in series between the diodes 11 and 12 and the resistor 13. A portion of one specific embodiment of a shift register circuit is depicted in Fig. 3. As there seen, each stage comprises a first ferroelectric condenser 31, a saturation diode 11, a normal diode 12, a second ferroelectric condenser 32, and a resistor 13 connected in series, the output terminal 15 being connected across the resistor 13 in this specific embodiment. The stages of the shift register are connected together by diodes 34 which are connected between the second ferroelectric condenser 32 of the prior stage and the first ferroelectric condenser 31 of the subsequent stage. The diodes 34 are poled so as effectively to connect the condensers 31 and 32 of adjacent stages together upon the application of a negative pulse 35 to the terminal 17.

When a positive power or store pulse 36, which may advantageously be of a magnitude $3S_1$, is applied between the pulse bus terminal 17 and ground, saturation diode 11 in the first stage is saturated and ferroelectric condensers 31A and 32A are effectively connected in series. Similarly, condensers 31B and 32B of the second stage are effectively connected in series by this positive power pulse 36 due to the saturation of the second stage saturation diode 11. When the negative pulse 35, which may be of a magnitude $-2S_1$, is applied to the terminal 17, condensers 31B and 32A are effectively connected in series through the interposed shift diode 34. The condensers 31A and 32B are not now connected in series due to the poling of the diodes 12 in both stages.

To understand the shifting of information in a shift register circuit in accordance with the specific embodiment of this invention depicted in Fig. 3, let us consider the operation of that circuit assuming that initially the dielectrics of the condensers 31A and 31B are both polarized in one direction and the dielectrics of the condensers 32A and 32B are initially polarized in the opposite direction; it may facilitate an understanding of the operation of the circuit if we consider the polarization of the condensers 31A and 31B to be downward and the polarizations of the condensers 32A and 32B to be upward. In order to store a "1" in condenser 31A, its polarization is to be shifted to be upward. We can consider that the diode 34 connected to condenser 31A is grounded by the action of the prior register stage or by applying ground potential directly thereto at the same time that the negative pulse 35 is applied to terminal 17.

This negative pulse 35 will shift the state of the condenser 31A. Due to the opposition presented by the diode 12 between the condensers 31A and 32A it will have no effect on the condenser 32A.

Next a positive pulse 36 of value $+3S_1$ is applied to the terminal 17 and thus to the common shift pulse bus. Let us consider only its action with respect to the first stage of the shift register circuit depicted. When the pulse is applied the interposed diode 11 is saturated and becomes a low impedance. We have a pair of series connected ferroelectric condensers polarized in the same direction and, as discussed above and in my Patent 2,695,396 issued November 23, 1954, the state of polarization of both such condensers will be shifted by the pulse applied thereacross. Thus at the termination of the positive pulse 36, condensers 31A, 32A and 31B will all be polarized in the downward direction and condenser 32B alone will be polarized in the upward direction.

The next subsequent negative pulse 36 applied to the terminal 17 of a value $-2S_1$ therefore finds a series connection including condenser 31B, diode 34, and condenser 32A in which the two condensers are polarized in the same direction and opposed to the polarity of the applied pulse 35. Accordingly the state of polarization of these two condensers will now be shifted. This will leave the polarization of the condensers at the termination of the pulse 36, such that condenser 31A alone is now polarized downward while condensers 32A, 31B and 32B are polarized upward.

It is therefore apparent that when the next positive pulse 36 is applied to the terminal 17, condensers 31B and 32B are polarized in the same direction while condensers 31A and 32A are polarized in the opposite direction. Thus the state of polarization of both condensers 31B and 32B will be shifted. Then on the next negative pulse 35 the state of condenser 32B and the condenser 31 of the next stage will be shifted. In this manner information may be transferred along the stages of the shift register circuit.

At the same time that the stage of polarization of a condenser 32 is reversed, an output pulse appears at the terminal 15 connected thereto. Each resistor 13 may be utilized as a means for developing an output pulse since all losses in the shift register, due to switching the crystals, are made up by the energy in the power pulse. As long as there are no leakage paths, there will be essentially no difference in the output pulse at the first and last stages of the shift register.

Figure 4:
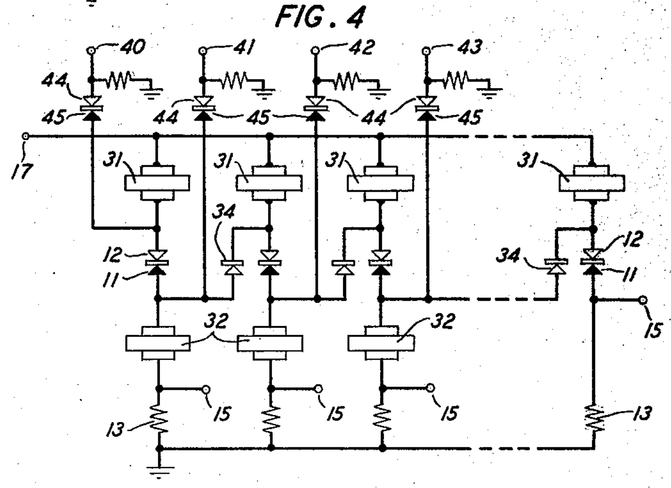
Fig. 4 is a schematic diagram of a shift register circuit employing parallel input and parallel output circuits in accordance with another embodiment of this invention.

Fig. 4 shows a shift register of the type disclosed in Fig. 3 in which parallel inputs and parallel outputs are available. Separate terminals 40, 41, 42 and 43 are connected to each stage through a pair of diodes 44 and 45 and individual output terminals 15 are connected to each stage. The ordinary diodes 44 prevent the output pulse of the preceding stage from passing to the input terminals, while saturation diodes 45 prevent random pulses at the input terminals from reaching the stages of the shift register. The operation of this circuit is unchanged by the reversal of the order of saturation diode 11 and diode 12 in each stage, since their polarity, with regard to the shift pulses remains unchanged. These saturation diodes similarly break down due to the application of positive pulses applied to terminal 17. Pulses may be stored in each stage simultaneously by connecting the appropriate terminals 40 through 43 to ground or by applying a positive pulse to the selected terminal at the same time that a negative pulse is applied to terminal 17 and the shift pulse bus connected thereto.

In the operation of this specific embodiment the saturation diodes 45 will act as open switches except when positive input pulses sufficient to overcome their reverse saturation voltages are applied. Likewise the saturation diodes 11 can be considered as acting as open circuits unless the voltage across them exceeds their reverse saturation voltage. By selecting the reverse saturation voltages of the diodes 11 approximately equal to the switching voltages across each condenser 31 or 32, successive stages are essentially isolated from each other when the positive power pulses are applied. The diodes 12 provide the isolation between the upper and lower condensers 31 and 32 during negative power pulses while the diodes 34 prevent backward flow of information. The saturation diodes 11 can, in various embodiments of the invention, be placed either in each vertical branch, as depicted in Fig. 4, or in series with the diodes 34. In the former case the negative power pulse should be about $2S_1$ in amplitude, where $S_1$ is again the saturation voltage and the voltage required for switching a ferroelectric crystal, while the positive power pulse should have an amplitude of $3S_1$. However in the latter case the negative pulse should be of the order of $-3S_1$ and the positive pulse $2S_1$. In either case however there is a series path in the shift register comprising a pair of ferroelectric condensers with a pair of interposed diodes, the diodes being poled in opposite directions and one of the diodes being a saturation diode.

Figure 5:
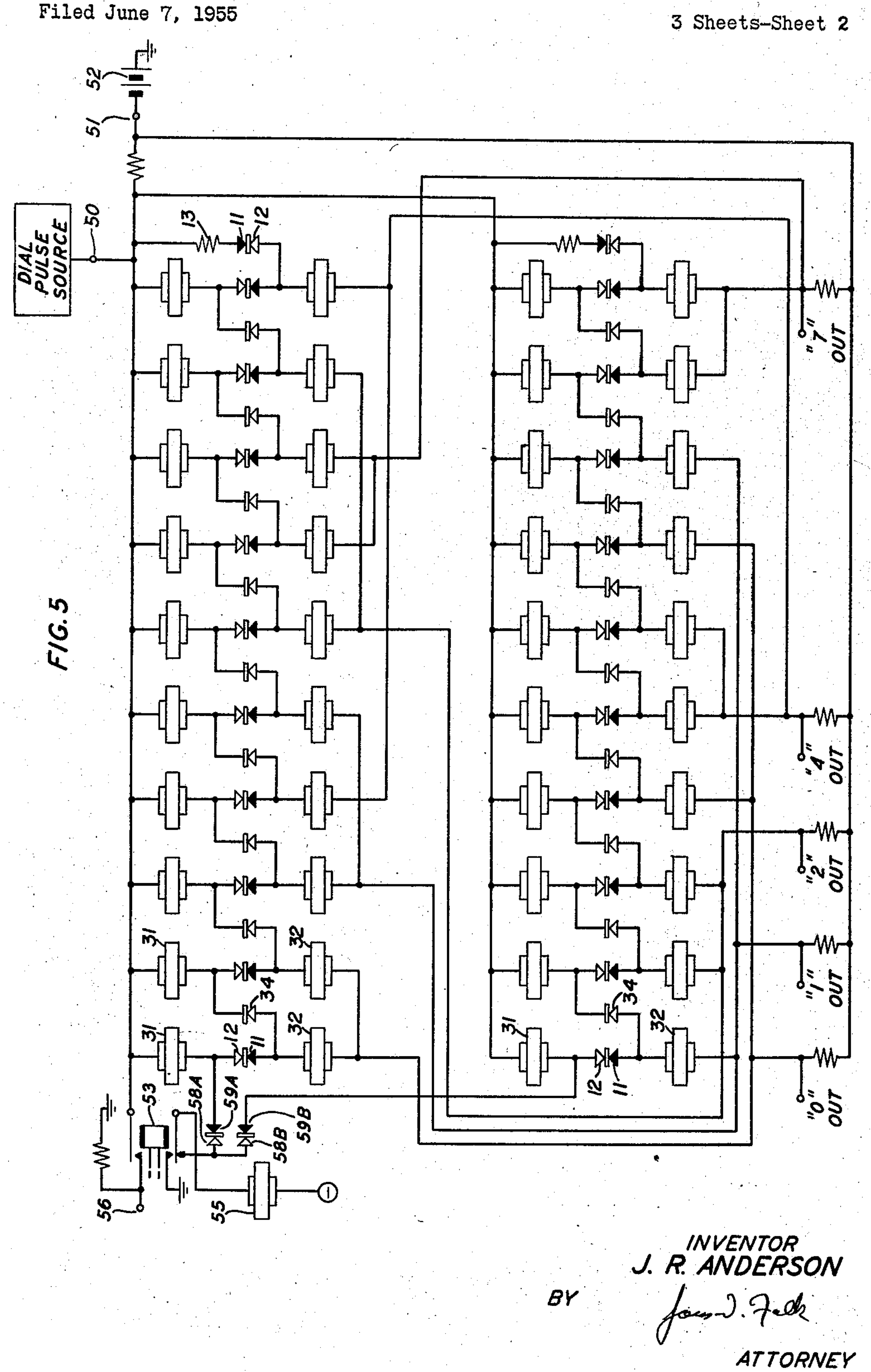
Fig. 5 is a schematic representation of another illustrative embodiment of this invention wherein code conversion is obtained.

Fig. 5 discloses a code conversion circuit utilizing a pair of shift registers in accordance with this invention. For the purpose of explanation, these shift registers will be designated as upper and lower shift registers. This circuit may be used to accomplish code conversion between dial pulses and a two-out-of-five code. The train of dial pulses is applied to a terminal 50 and acts as the power pulse source to control the shifting of the stored pulses in each of the two shift registers. A source 52 of reference potential intermediate the value of the dial pulses is applied to terminal 51 so the dial pulses effectively constitute a square wave signal of alternate positive and negative polarities. A relay 53 operates in the inter-digit interval to set or store a "1" in ferroelectric condenser 55 and to clear the pulses stored in the two shift registers. The inter-digit interval is defined as the interval between two trains of dial pulses, each train of which represents a digit. A source of clear pulses is applied to terminal 56 which effectively clears any stored pulses in the shift register when relay 53 is actuated.

For the purposes of explanation of the operation of this specific embodiment of the invention, let us assume that dial signals representing the digits 4 and 6 are to be applied to terminal 50 and the corresponding code pulses are to be transmitted from the output terminals. At the beginning of the four pulses applied to terminal 50 representing the digit 4, relay 53 is released reading out the information pulse previously stored in condenser 55 through pairs of diodes 58A, 59A and 58B, 59B into the upper ferroelectric condenser of each of the two shift registers. Diodes 58 are normal diodes and diodes 59 saturation diodes. Condenser 55 is advantageously sufficiently large in comparison to the condensers of the shift registers that its output pulse can polarize two condensers of the shift register. The dial pulses applied to terminal 50 now act as power pulses to transfer these single pulses in each of the two shift registers to a stage corresponding to the number of dial pulses applied in a manner similar to that employed in Fig. 3. Thus, four dial pulses shift the stored pulses of the two shift registers to the fourth stage of each of the shift registers. Accordingly, it is seen that we now have stored two pulses, which represent the digit 4 in the new code. Between the application of the pulses representing digit 4 and those pulses representing digit 6, i. e. in this inter-digit interval, inter-digital relay 53 closes applying ground to condenser 55 reversing the state of polarization of condenser 55 and connecting the source of clear pulses to the power bus terminal 56. This causes the output to appear at the appropriate output terminals "0" OUT and "4" OUT and shifts the stored pulses progressively along each stage until the stored pulses are cleared from the shift registers. The circuit is now in a condition to receive the next digit pulses representing digit 6. When relay 53 is again released, condenser 55 delivers an output pulse to the first condenser of the upper and lower shift registers respectively. The six pulses representing digit 6 are now applied at terminal 50 to transfer these stored pulses to the sixth stage of the upper and lower shift registers. This transfer results in output pulses being obtained at the terminals marked "2" OUT and "4" OUT when relay 53 is again operated. While this specific embodiment has been explained in connection with a code conversion from digital dial pulses to a two-out-of-five code, it is readily understood that other systems of code conversions may be accomplished by interconnecting the appropriate output terminals of the upper and lower shift registers.

Figure 6:
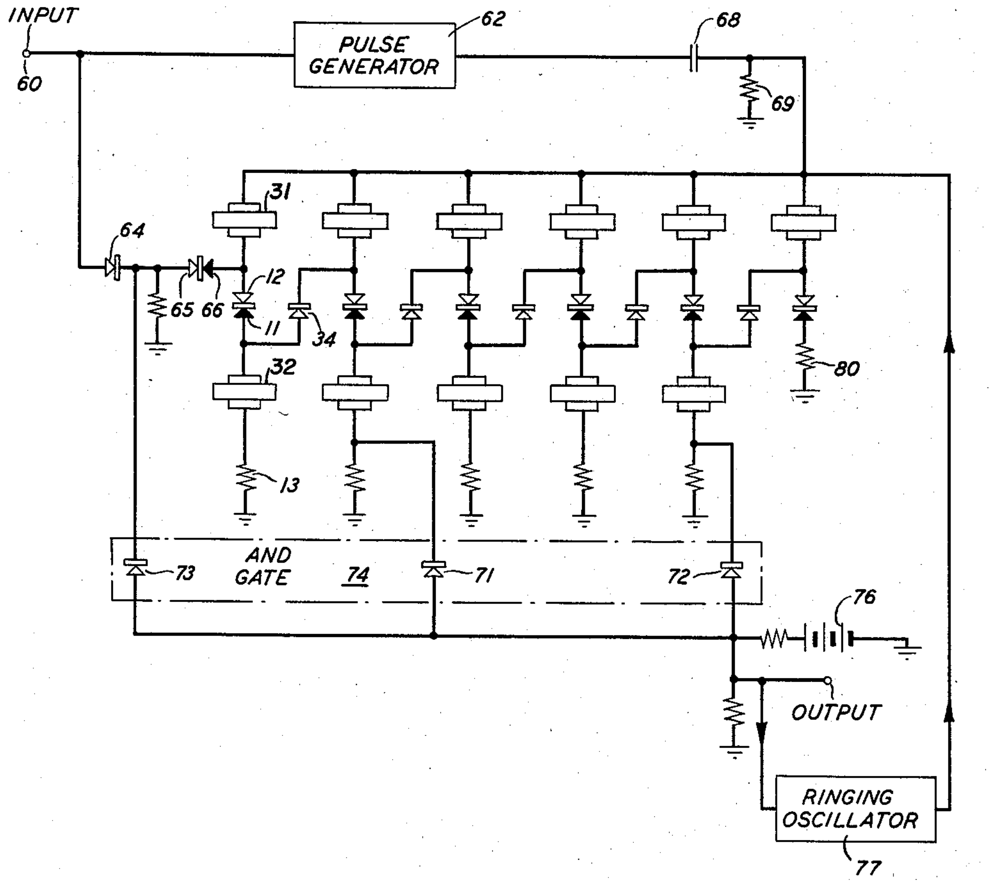
Fig. 6 is a combined schematic and block representation of a code operated selective signaling circuit illustrative of still another embodiment of this invention.

Fig. 6 depicts another embodiment of this invention which accomplishes full selective ringing on a party line. A shift register which responds to a predetermined code actuates a ringing oscillator thereby transmitting a signal to the subscriber. Input terminal 60 is connected to the communications line to which is applied the signaling code pulses. These pulses consist of a train which may be of five pulses positive or negative followed by a positive end-of-word pulse. This train of pulses is applied to pulse generator 62 as well as to the first condenser 31 of the shift register, through diodes 64, 65 and 66, diodes 64 and 65 being normal diodes and diode 66 being a saturation diode. Pulse generator 62 is keyed by the word pulse and transmits a train of square wave pulses of negative polarity to condenser 68 and resistor 69. Condenser 68 and resistor 69 constitute a differentiating network which delivers alternate, positive and negative spikes in response to a square wave input. These spikes are applied to all of the stages of the shift register. The word pulse consists of five pulses of either positive or negative polarity followed by a sixth pulse which designates the end of the word. When these pulses are applied to the shift register through diodes 64, 65 and 66, they are transferred to the several stages in response to the positive and negative spikes from the differentiating circuit, reshifting of information along the shift register circuit being as described above with respect to Fig. 3. If the incoming word constitutes the predetermined code for which this shift register is selected, which in one exemplary embodiment we shall assume to be 100101, then the first and second "1's" will be fed into the shift register through diodes 64, 65 and 66 and these stored digits will be shifted along in response to alternate spikes from the differentiating circuit. After the fifth positive spike, these pulses are stored in the fifth and second stages, respectively, and an output pulse will be derived from these pulses and applied concurrently to diodes 71 and 72 of an And gate 74. Simultaneously with these output pulses, the end-of-the-word pulse will be applied to diode 73 of the gate 74. These pulses will prevent the current flowing from source 76 through diodes 71, 72, or 73 and cause this current to flow to the ringing oscillator 77. In this way the ringing oscillator 77 is activated and notifies the subscriber of the incoming call. Ringing oscillator 77 also transmits a clear signal to the shift register bus which clears the stored pulses in the register by shifting them to the sixth stage and out through resistor 80. This clear signal will not result in any additional combined signals being delivered through the And gate since no pulses are being applied through diode 73. The ringing oscillator may advantageously be so connected as to have its output interrupted upon the removal of the subscriber's handset from the cradle.

Figure 7:
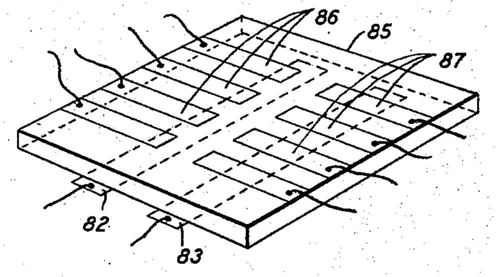
Fig. 7 is a perspective view of a multi-unit ferroelectric storage element that may be employed in a shift register in accordance with certain embodiments of this invention.

Fig. 7 is a perspective view of a multi-condenser ferroelectric storage device that may be employed in shift register circuits in accordance with certain specific embodiments of this invention wherein a pair of parallel electrodes 82 and 83 extend lengthwise along one side of a slab 85 of a ferroelectric material. A plurality of short electrodes 86 extend partially along the other side of the slab 85 from one edge thereof and define a first plurality of ferroelectric condensers with the electrode 82 and a plurality of short electrodes 87 extend partially along the other side of slab 85 from the opposite edge thereof and define a second plurality of ferroelectric condensers with the electrode 83. The electrodes 86 advantageously extend perpendicular to the direction of the electrode 82 and the electrodes 87 advantageously extend perpendicular to the electrode 83. The first plurality of condensers defined between the electrodes 82 and 86 may comprise the ferroelectric condensers of the upper section of a shift register circuit in accordance with this invention, the electrode 82 being connected to the power pulse terminal 17, and the second plurality of condensers defined between the electrodes 83 and 87 may comprise the ferroelectric condensers of the lower section of a shift register circuit, in which circuit the electrode 83 is connected through a common resistor 13 to ground.

Advantageously in shift registers in accordance with this invention the total charge $Q_n$ which can be switched in any condenser of one stage should be equal to or larger than the total charge $Q_{n-1}$ which can be switched in a condenser of the preceding stage; that is $$Q_n \geqq Q_{n-1} \quad (1)$$

This may readily be assured by employing tapered electrodes, the electrodes being widest at the last stage of the shift register circuit.

Reference may be made to my application Serial No. 564,024, filed February 7, 1956, wherein there are claimed certain aspects of the present invention disclosed but not claimed herein.

It is to be understood that the above-described arrangements are illustrative of the application of the principles of the invention. Numerous other arrangements may be devised by those skilled in the art without departing from the spirit and scope of the invention.

What is claimed is:

1. A shift register circuit comprising a plurality of stages of pairs of ferroelectric condensers connected in series between a common bus and a source of reference potential, a pair of diodes connected in series opposition between each of said ferroelectric condensers, one of said diodes exhibiting a reverse voltage saturation characteristic, input means connected to at least one of said stages, means for simultaneously applying shift pulses to each of said stages, coupling means between said stages, and output means connected to at least one of said stages.

2. A shift register in accordance with claim 1 wherein said input means includes saturation diode means.

3. A shift register in accordance with claim 2 further including output means connected to a plurality of said stages between the second condenser of each stage and a source of reference potential.

4. A shift register circuit in accordance with claim 1 in which the saturation voltage of said one diode is at least as large as the voltage required to switch the state of polarization of said ferroelectric condenser.

5. A shift register circuit in accordance with claim 1 wherein input means are connected to each of said stages and include a saturation diode and wherein said coupling means between said stages includes diode means.

6. An electrical circuit comprising a first and a second serially connected ferroelectric condenser, a first and a second diode connected in series opposition between said first and said second condensers, one of said diodes exhibiting a reverse voltage saturation characteristic, a third diode connected intermediate said first condenser and said first and said second diodes, means for applying pulses to said third diode, means for applying pulses across said first and second condensers, first output means connected to said second condenser at a point remote from said first and said second diodes and second output means connected intermediate said second condenser and said first and second diodes.

7. A ferroelectric shift register comprising a plurality of interconnected stages, said stages comprising first and second serially connected ferroelectric storage condensers, pulse amplitude and polarity responsive switching means connected between said condensers, input means connected intermediate said switching means and at least one of said first condensers, coupling means including a unilateral impedance element connected to a prior stage intermediate said switching means and said second condenser and connected to a subsequent stage intermediate said first condenser and said switching means, means for applying positive and negative pulses across said first and second condensers, and output means connected to at least one of said stages.

8. A ferroelectric shift register in accordance with claim 7 wherein said pulse amplitude and polarity responsive switching means comprises a pair of serially connected oppositely poled diodes, one of said diodes exhibiting a reverse voltage saturation characteristic.

9. A ferroelectric shift register for deriving both series and parallel outputs comprising a parallel network of pairs of serially connected ferroelectric condensers, pulsing means connected across at least one of said condensers for applying storage pulses to said condenser, serially operating amplitude and polarity responsive switching means connected between each of said pairs of condensers, coupling means interconnecting pairs of said condensers, shift pulsing means connected across said parallel network to shift the stored pulses through said coupling means, and output means connected to at least certain of said condensers.

10. A shift register circuit comprising a plurality of stages each including a pair of serially connected ferroelectric condensers, a pair of unilateral impedance elements oppositely poled and connected in series between each of said pairs of condenser, one of said elements having a reverse voltage saturation characteristic, means for storing pulses in at least one of said condensers, unidirectional impedance means connecting each stage of the register to a succeeding stage, output means connected to one of said stages and a source of shift pulses of alternate polarity connected across said pairs of series connected condensers.

11. A code conversion circuit comprising a pair of ferroelectric shift registers, said shift registers including a plurality of stages, each including a pair of serially connected ferroelectric condensers, a plurality of pairs of diodes serially connected in each stage between said pairs of ferroelectric condensers, one of said diodes exhibiting a reverse voltage saturation characteristic, diode means connecting each stage of one shift register to a succeeding stage of that shift register, means for simultaneously applying an input pulse to each of said shift registers, pulse means for simultaneously applying shift pulses to each stage of said registers, output means selectively connecting stages of said pairs of shift registers, said output means including a plurality of output terminals, and means for applying clear pulses to said pair of shift registers whereby a pair of output pulses are derived at predetermined points of said output terminals depending on the number of shift pulses applied by said shift pulse means.

12. A code recognition circuit comprising a ferroelectric shift register including a plurality of stages each having a pair of serially connected ferroelectric condensers, a common bus connected to each of said stages, a pair of diodes connected in series opposition between each of said pairs of condensers, one of said diodes exhibiting a reverse voltage saturation characteristic, diode means connecting each of said stages to a succeeding stage, means for applying a pulse train to said shift register, means for applying a series of shift pulses to said bus in response to said pulse train, gate means selectively connected to certain of said stages and said pulse train means, output means connected to said gate means, and means for clearing said shift register in response to a pulse at said output means.

13. An electrical circuit comprising a pair of ferroelectric condensers, a pair of diodes serially connected between said ferroelectric condensers, said diodes being poled in series opposition and at least one of said diodes having a reverse voltage saturation characteristic, and means for applying pulses across said pair of condensers and interposed diodes.

14. An electrical circuit in accordance with claim 13 wherein the reverse saturation voltage of said one diode is approximately the voltage required to effect switching of the state of polarization of said ferroelectric condensers.

15. An electrical circuit as defined in claim 13 wherein said diodes are included in a single semiconductor unit.

16. An electrical circuit comprising a pair of ferroelectric condensers, an asymmetrically conducting diode voltage breakdown switching means interposed between said ferroelectric condensers, said switching means having a reverse voltage saturation characteristic, and means for applying pulses across said pair of condenssrs and said interposed voltage breakdown switching means.

References Cited in the file of this patent

UNITED STATES PATENTS 2,666,195 Bachelet et al. ---------- Jan. 12, 1954